(12) United States Patent
Guegan et al.

(10) Patent No.: US 11,627,825 B2
(45) Date of Patent: Apr. 18, 2023

(54) MODULAR STEAMER ACCESSORY FOR STEAM-HEATING AND/OR STEAM-COOKING FOOD CONTAINED IN A CONTAINER

(71) Applicant: SEB S.A., Ecully (FR)

(72) Inventors: Laurent Guegan, Lornay (FR); Olivier Delrue, Selongey (FR); Laurent Blond, Beaune (FR)

(73) Assignee: SEB S.A.

( * ) Notice: Subject to any disclaimer, the term of this patent is extended or adjusted under 35 U.S.C. 154(b) by 181 days.

(21) Appl. No.: 16/471,193

(22) PCT Filed: Dec. 18, 2017

(86) PCT No.: PCT/FR2017/053671
§ 371 (c)(1),
(2) Date: Jun. 19, 2019

(87) PCT Pub. No.: WO2018/115698
PCT Pub. Date: Jun. 28, 2018

(65) Prior Publication Data
US 2019/0380524 A1    Dec. 19, 2019

(30) Foreign Application Priority Data
Dec. 20, 2016   (FR) ...................... 1662879

(51) Int. Cl.
*A47J 27/04*    (2006.01)
*A47J 27/00*    (2006.01)
(Continued)

(52) U.S. Cl.
CPC ............. *A47J 27/04* (2013.01); *A47J 27/004* (2013.01); *A47J 37/0611* (2013.01);
(Continued)

(58) Field of Classification Search
CPC .... A47J 2027/043; A47J 27/004; A47J 27/04; A47J 37/0611; A47J 37/0676; A47J 43/0772
See application file for complete search history.

(56) References Cited

U.S. PATENT DOCUMENTS 2,141,822 A * 12/1938 Porter ..................... A47J 36/06
126/381.1
3,028,039 A *  4/1962 Clark ..................... A47J 37/101
220/366.1
(Continued)

FOREIGN PATENT DOCUMENTS

CA       2 945 650 A1    12/2016
DE    202014100001 U1 *  2/2014   ............. A47J 27/06
(Continued)

OTHER PUBLICATIONS

International Search Report as issued in International Patent Application No. PCT/FR2017/053671, dated Mar. 29, 2018.

*Primary Examiner* — Jorge A Pereiro
*Assistant Examiner* — Logan P Jones
(74) *Attorney, Agent, or Firm* — Lerner David LLP

(57) ABSTRACT

A steamer accessory for steam-heating and/or -cooking food contained in a container, the steamer accessory including a steam generator including a steam production chamber connected to at least one steam distribution outlet provided in a lower part of the steam generator, the steamer accessory including a ring carrying the steam generator, the ring having a lower surface and an upper surface. The ring provides, if so required, with the steam generator, at least one vent bringing the lower surface into communication with the upper surface.

11 Claims, 4 Drawing Sheets

Figure 1:
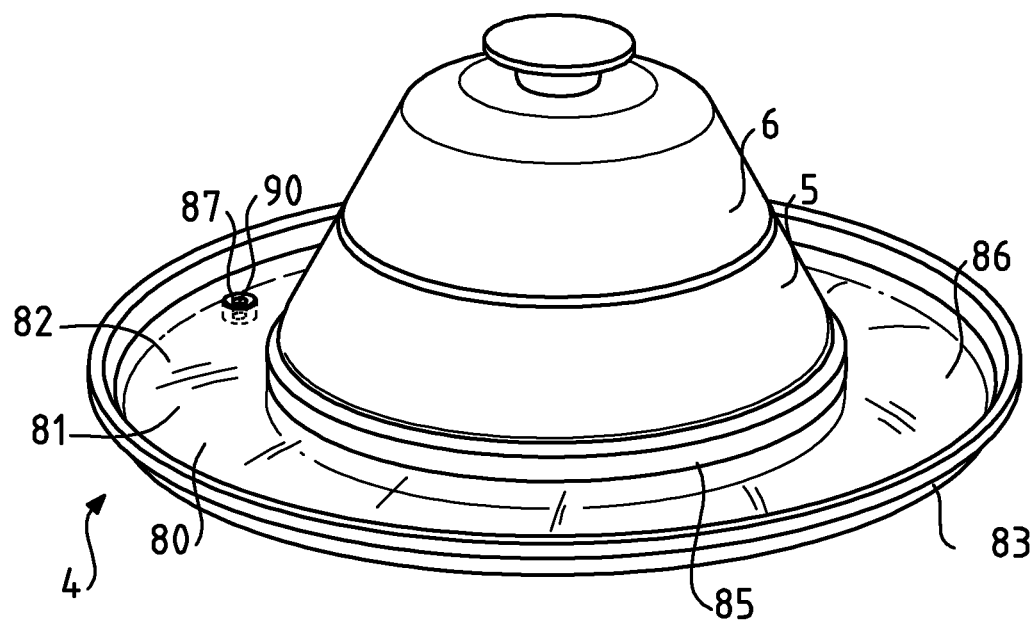

(51) Int. Cl.
  *A47J 37/06* (2006.01)
  *A47J 43/07* (2006.01)
  *A47J 36/06* (2006.01)
  *A47J 27/08* (2006.01)

(52) U.S. Cl.
  CPC ........ *A47J 37/0676* (2013.01); *A47J 43/0772* (2013.01); *A47J 2027/043* (2013.01)

(56) References Cited

U.S. PATENT DOCUMENTS

| | | | | |
|---|---|---|---|---|
| 3,598,105 | A * | 8/1971 | Cristaldi | A47J 36/06 126/21 R |
| 4,512,497 | A * | 4/1985 | Grusin | A47J 47/02 126/389.1 |
| 6,530,308 | B1 * | 3/2003 | Lin | A47J 27/04 219/386 |
| 8,604,394 | B2 * | 12/2013 | Wu | A47J 37/0676 219/450.1 |
| 2002/0178932 | A1 * | 12/2002 | Cai | A47J 36/24 99/516 |
| 2011/0014342 | A1 * | 1/2011 | Picozza | A47J 36/2433 426/474 |
| 2015/0024104 | A1 * | 1/2015 | Denny | A47J 36/06 426/523 |
| 2016/0066738 | A1 * | 3/2016 | Shibuya | F24C 15/327 219/401 |

FOREIGN PATENT DOCUMENTS

| | | | |
|---|---|---|---|
| FR | 2 161 447 A5 | 7/1973 | |
| GB | 2 391 163 A | 2/2004 | |
| JP | S5245785 U * | 3/1977 | |
| WO | WO-2015087012 A1 * | 6/2015 | ............ A47J 27/04 |

\* cited by examiner

MODULAR STEAMER ACCESSORY FOR STEAM-HEATING AND/OR STEAM-COOKING FOOD CONTAINED IN A CONTAINER

CROSS REFERENCE TO RELATED APPLICATIONS

This application is the U.S. National Stage of PCT/FR2017/053671, filed Dec. 18, 2017, which in turn claims priority to French Patent Application No. 1662879 filed Dec. 20, 2016, the entire contents of all applications are incorporated herein by reference in their entireties.

This invention concerns the technical field of steam production apparatuses and devices for steam-heating and/or steam-cooking food.

More specifically, this invention concerns steamer accessories for steam-heating and/or steam-cooking food contained in a container.

This invention also concerns apparatuses for steam-heating and/or steam-cooking food, comprising a container associated with a steam production device forming such a steamer accessory.

From the document U.S. Pat. No. 6,530,308 we know of a steamer accessory comprising a steam generator comprising a steam production chamber comprising a heating device, the steam production chamber being connected to at least one steam distribution outlet provided in a lower part of the steam generator. This arrangement allows steam to be injected into a cooking enclosure arranged below the steam generator. The steam production chamber is supplied with water by means of a drop control device. However, this device is more suited to a one-off injection of steam into a grill than for heating or cooking food with steam.

One objective of this invention is to propose a steamer accessory used with a container for steam-heating and/or steam-cooking food, and which allows the escape of steam to be controlled.

Another objective of this invention is to propose a steamer accessory used with a container for steam heating and/or steam-cooking food, and which is suited to different sizes of containers.

Another objective of this invention is to propose a steamer accessory used with a container for steam heating and/or steam-cooking food, and which is economical to construct.

Another objective of this invention is to propose an electric steamer for steam-heating and/or steam-cooking food comprising a container and a steamer accessory, and which allows the escape of steam to be controlled.

Another objective of this invention is to propose an electric steamer for steam heating and/or steam-cooking food comprising a container and a steamer accessory, and which is suited to different sizes of containers.

Another objective of this invention is to propose an electric steamer for steam-heating and/or steam-cooking food comprising a container and a steamer accessory, and which is economical to construct.

These objectives are achieved with a steamer accessory for steam-heating and/or steam-cooking food contained in a container, the steamer accessory comprising a steam generator comprising a steam production chamber connected to at least one steam distribution outlet provided in a lower part of the steam generator, the steamer accessory comprising a ring carrying the steam generator, the ring having a lower face and an upper face, because the ring provides, if desired, with the steam generator, at least one vent bringing the lower face of the ring into communication with the upper face of the ring. In other words, the said vent can be provided either in the ring, or between the ring and the steam generator. The same type of steam generator can thus be used with different sizes of rings. This arrangement facilitates adapting the steamer accessory to different sizes of containers. This arrangement also allows better control of the escape of steam from the enclosure formed by the steamer accessory and the container used with the steamer accessory.

Advantageously then, the ring is removable from the steam generator. This arrangement allows different rings to be used with the same steam generator.

Advantageously again, the ring has an annular wall surrounding the steam generator. The annular wall thus defines the majority of the lower face and of the upper face of the ring, or even the entirety of the lower face and/or of the upper face of the ring.

Advantageously then, the annular wall is made of glass. This arrangement makes it possible to observe the steam-cooking.

According to one embodiment, the said vent passes through the annular wall. This arrangement allows the size of the vent to be defined according to the ring used. This arrangement also allows the vent to be removed from the steam generator.

According to one embodiment, the said vent is formed by a conduit bringing the lower face of the ring into communication with the upper face of the ring. This arrangement allows better control of the escape of the steam. This arrangement also allows the size of the vent to be defined according to the ring used. This arrangement also allows the vent to be removed from the steam generator.

According to another embodiment, the said vent is provided between the ring and the steam generator. This arrangement simplifies the execution of the ring. However, the ring and the steam generator do not necessarily each have an indentation providing a portion of the vent.

Advantageously again, the ring has an annular seal carrying the steam generator. This arrangement achieves better leaktightness between the ring and the steam generator.

According to another embodiment, the said vent is provided in the annular seal.

Alternatively, the vent can be delimited at the same time by the ring and by the steam generator, in particular at the same time by the annular seal and by the steam generator.

Advantageously again, the steamer accessory comprises a water reservoir. Such an embodiment is well suited to a household appliance.

Advantageously then, the water reservoir is carried by the ring.

Advantageously again, the steamer accessory comprises a water reservoir supplying the steam production chamber with water. This arrangement allows a smaller quantity of water to be heated, which helps obtain steam more quickly. Alternatively, the steam production chamber could comprise the water reservoir. In other words, the steam production chamber then comprises a heating device allowing the water reservoir to be heated as in a boiler, for example.

According to one embodiment, the water reservoir is removable from the steam generator and the steam generator carries the removable water reservoir. This arrangement facilitates the filling of the water reservoir.

Advantageously again, the steam generator has an annular lower bearing surface. This arrangement permits placing the steam generator on the top edge of a container or of an adapter.

Advantageously again, the steam generator has a lower wall in which is formed the said at least one steam distribution outlet, and the steam production chamber is arranged in the steam generator away from the lower wall. These arrangements allow having a steam distribution chamber beneath the steam production chamber, which allows more freedom in the arrangement of the steam distribution outlets.

Advantageously again, the steam generator has an external side wall and the steam production chamber is arranged in the steam generator away from the external side wall. These arrangements permit limiting the temperature of the external side wall of the steam generator.

These objectives are also achieved with an electric steamer comprising a container to contain the food to be heated and/or cooked, and a cover intended to rest on the container, in which the cover forms a steamer accessory for steam-heating and/or steam-cooking the food contained in the container, because the steamer accessory conforms to at least one of the aforementioned characteristics.

Figure 2:
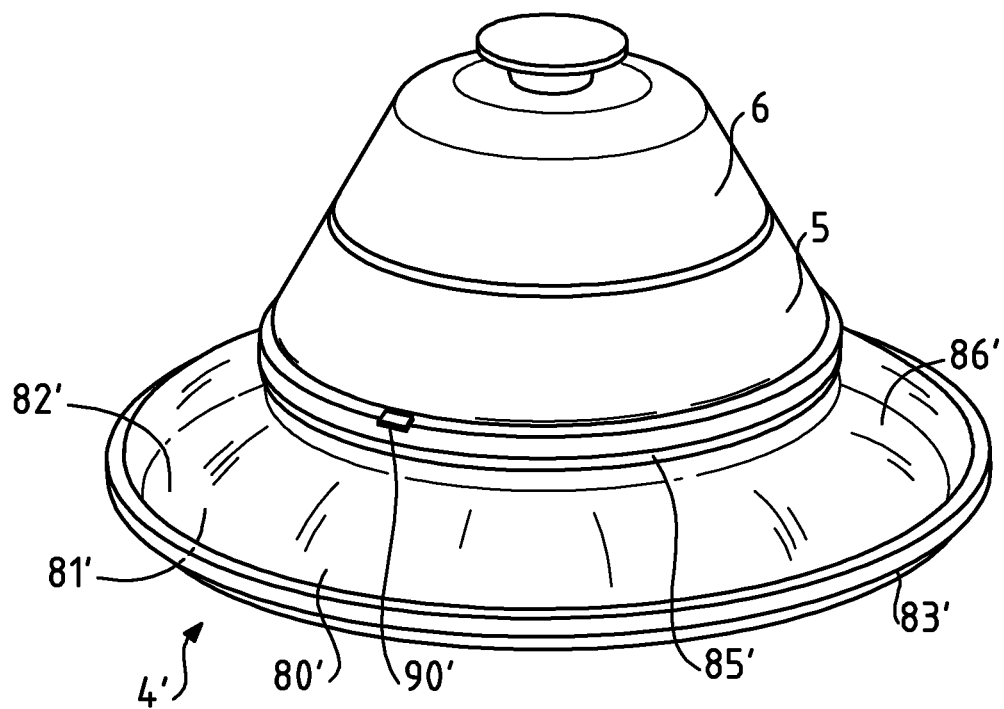
Figure 3:
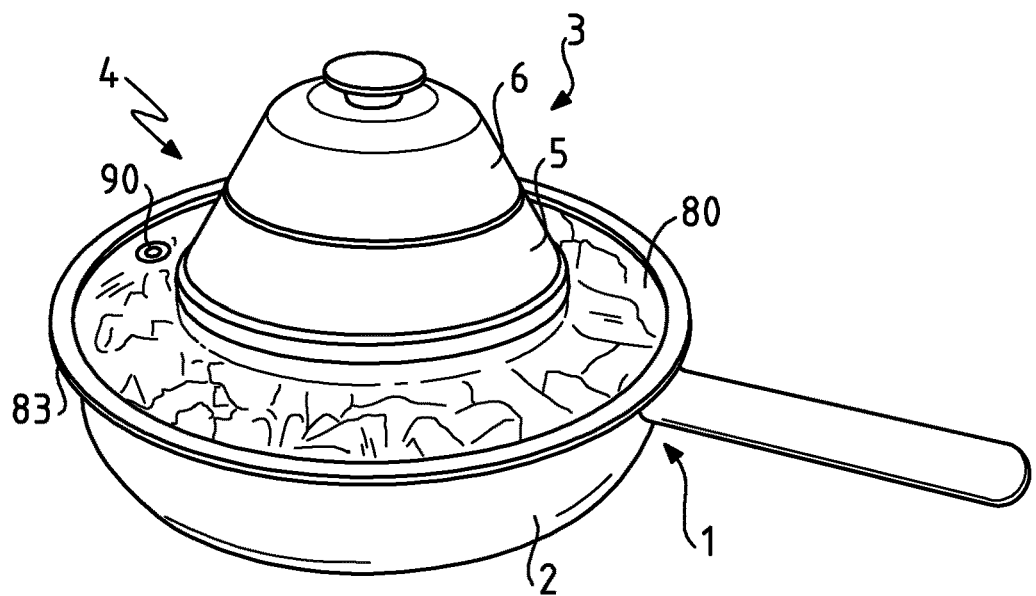
Figure 4:
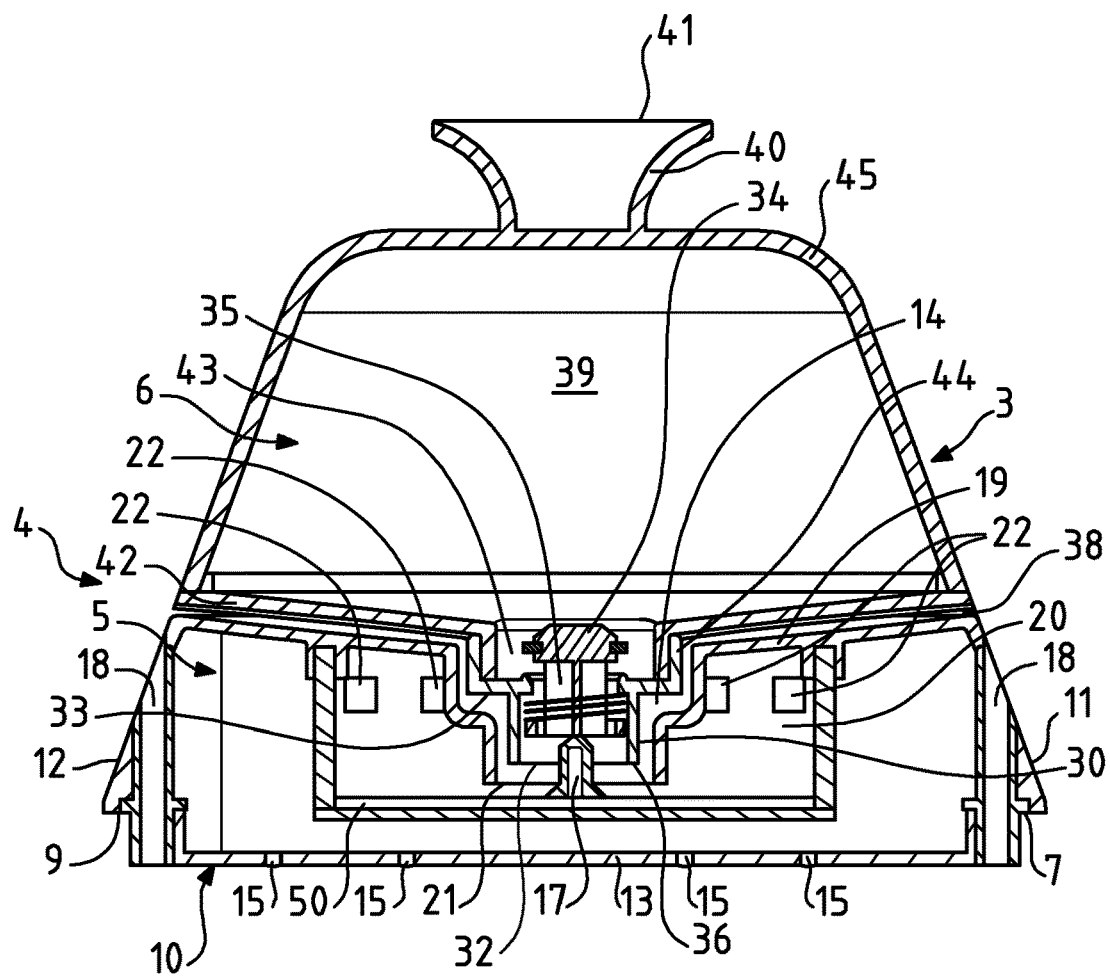
Figure 5:
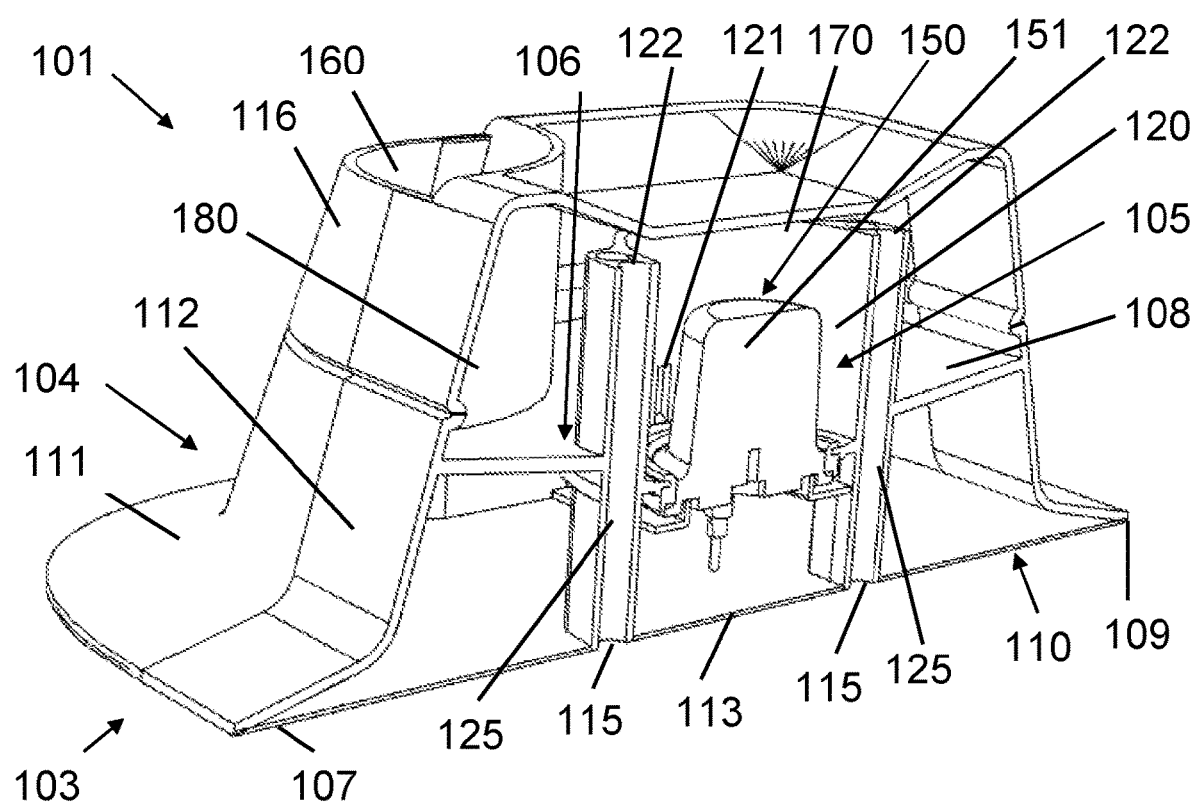
Figure 6:
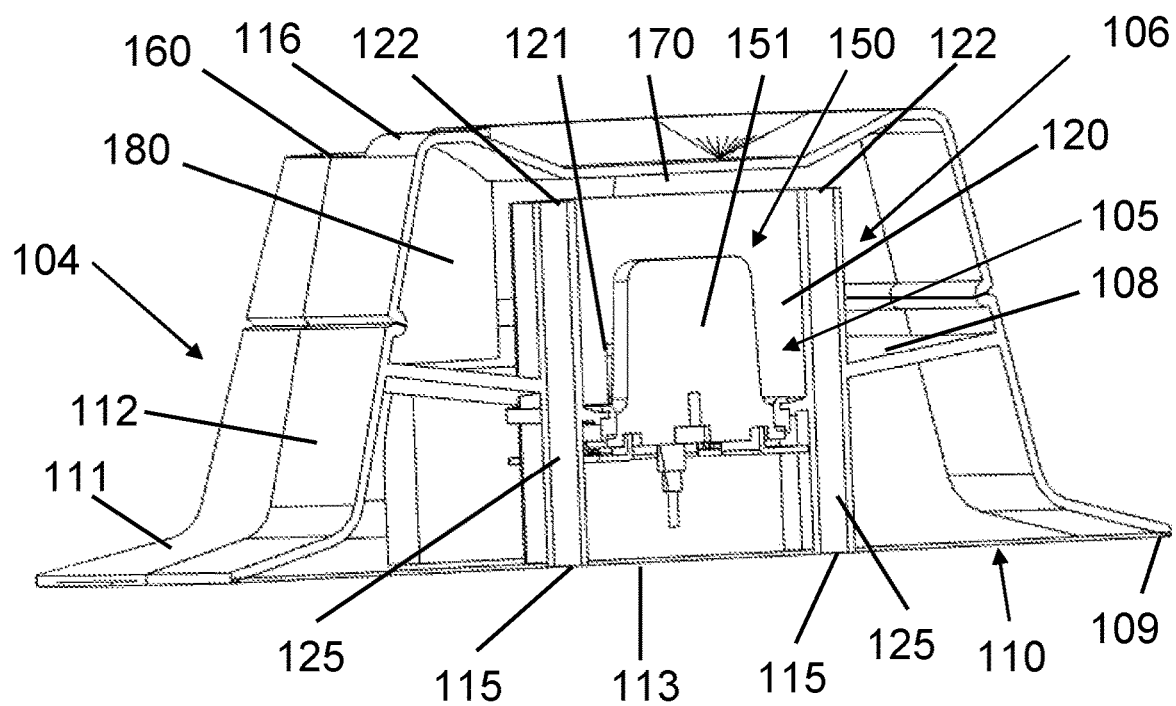
Figure 7:
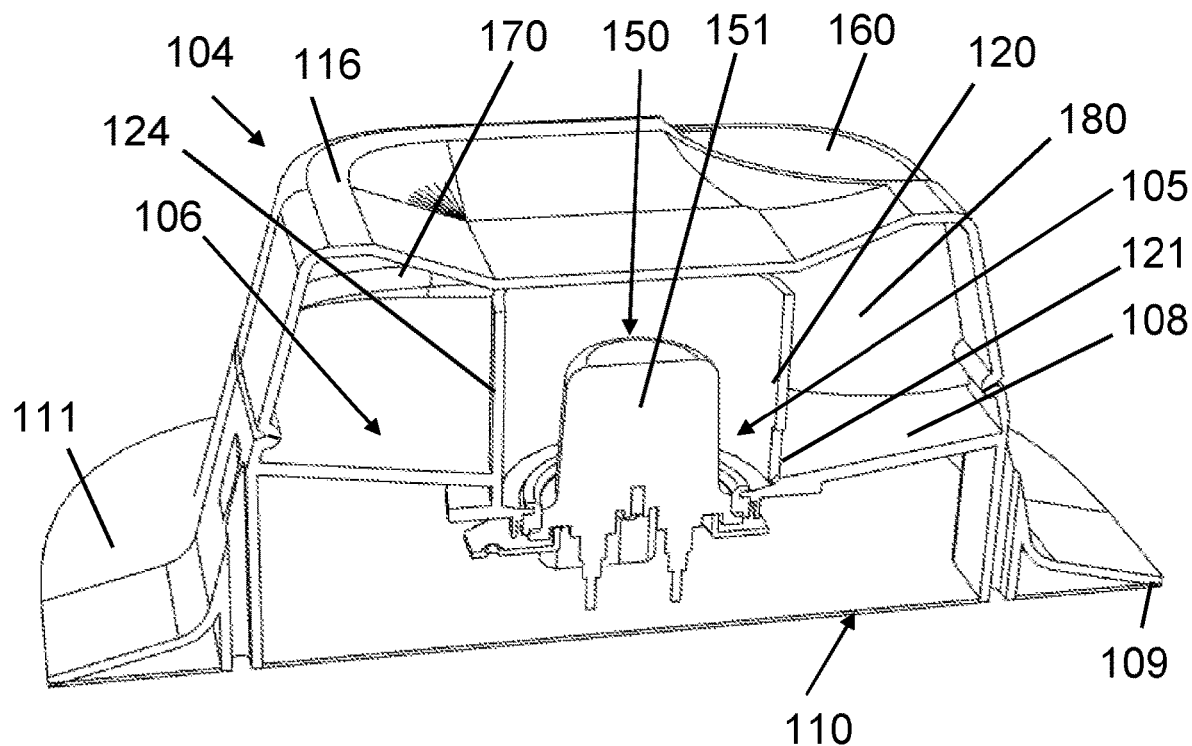

The invention will be more fully understood in consideration of two embodiment examples, which are in no way restrictive, illustrated in the attached FIGS. 1 to 6, in which:

FIG. 1 is a schematic elevation view of a first embodiment example of a steamer accessory according to the invention, FIG. 2 is a schematic elevation view of a second embodiment example of a steamer accessory according to the invention, FIG. 3 is a schematic elevation view of the steamer accessory illustrated in FIG. 1, arranged on a cooking container in order to form an electric steamer according to the invention, FIG. 4 is a schematic elevation cross-sectional view of a first embodiment of a heating part of the steamer accessories illustrated in FIGS. 1, 2 and 3, FIG. 5 is a perspective cross-sectional view of a second embodiment of a heating part of a steamer accessory, FIG. 6 is a perspective cross-sectional view of the heating part illustrated in FIG. 5, according to another orientation, FIG. 7 is a perspective cross-sectional view of the heating part illustrated in FIGS. 5 and 6, according to another cross section.

FIGS. 1 and 2 illustrate two embodiment examples of a steamer accessory 4, 4' for steam-heating and/or steam-cooking food contained in a container. The steamer accessory 4 illustrated in FIG. 1 and the steamer accessory 4' illustrated in FIG. 2 comprise a steam generator 5. The steamer accessory 4 illustrated in FIG. 1 comprises a ring 80. The steamer accessory 4' illustrated in FIG. 2 comprises a ring 80'.

The ring 80; 80' carries the steam generator 5. The ring 80; 80' has a lower face 81; 81' and an upper face 82; 82'. The ring 80; 80' surrounds the steam generator 5. The ring 80; 80' has an edge 83; 83' intended to rest on a container. The ring 80; 80' has an annular wall 86; 86' surrounding the steam generator 5. The ring 80; 80' has a vent 90; 90' bringing the lower face 81; 81' into communication with the upper face 82; 82'.

More specifically, in the embodiment examples illustrated in FIGS. 1 and 2, the ring 80; 80' is removable from the steam generator 5. The ring 80; 80' has an annular seal 85; 85' carrying the steam generator 5.

More specifically, in the embodiment examples illustrated in FIGS. 1 and 2, the annular wall 86; 86' is made of glass. As represented schematically in FIG. 1, the annular wall 86 is flat. As represented schematically in FIG. 2, the annular wall 86' is rounded upwards. The edge 83; 83' can be made of metal, in particular of stainless steel. As a variant, the annular wall 86; 86' can in particular be made of metal, in particular of stainless steel. The edge 83; 83' can then, if desired, be integrated in the annular wall 86; 86'.

In the embodiment example illustrated in FIG. 1, the vent 90 passes through the annular wall 86. More specifically, the vent 90 is formed by a conduit 87 bringing the lower face 81 of the ring 80 into communication with the upper face 82 of the ring 80. If desired, the conduit 87 may extend below the lower face of the annular wall 86 and/or above the upper face of the annular wall 86. The conduit 87 can in particular be formed by two joined metal parts, which may be screwed together, for example. This arrangement conserves the thickness of the annular wall 86 around the perforation provided in the annular wall 86 to house the conduit 87. The conduit 87 can thus rest on the upper face of the annular wall 86 and against the lower face of the annular wall 86. As a variant, the conduit could in particular come out of the annular wall 86.

In the embodiment example illustrated in FIG. 2, the vent 90' is provided between the ring 80' and the steam generator 5. More specifically, the vent 90' is provided in the annular seal 85'.

The electric steamer 1 illustrated schematically in FIG. 3 is an appliance for steam-heating and/or steam-cooking food, comprising a container 2 to contain the food to be heated and/or cooked, and a cover 3 intended to rest on the container 2. The cover 3 forms a steamer accessory 4 for steam-heating and/or steam-cooking food contained in the container 2. The steamer accessory 4 rests on the container 2. More specifically, the ring 80 rests on the container 2. The vent 90 discharges above the container 2.

According to the diameter of the container 2 used, the edge 83 of the ring 80 may or may not rest on the top edge of the container 2.

In the embodiment illustrated in FIG. 4, the steamer accessory 4 comprises the steam generator 5 and a water reservoir 6. The water reservoir 6 is removable from the steam generator 5 and the steam generator 5 carries the removable water reservoir 6. The steam generator 5 comprises a water inlet 14 supplied with water by the water reservoir 6 arranged on the steam generator 5. The steam generator 5 comprises a steam production chamber 20. The water reservoir 6 supplies the steam production chamber 20 with water. In this regard, the steam production chamber 20 has a water supply inlet 21 supplied with water by the water reservoir 6 arranged on the steam generator 5. The steam production chamber 20 comprises a heating device 50 to transform the water in the steam production chamber 20 into steam. The steam production chamber 20 has at least one steam evacuation outlet 22. The steam production chamber 20 is connected to at least one steam distribution outlet 15 provided in a lower part 10 of the steam generator 5.

More specifically, the steam generator 5 has an annular lower bearing surface 9 intended to rest on the ring 80; 80'. The water inlet 14 of the steam generator 5 is arranged in an upper face 19 of the steam generator 5. The water inlet 14 forms a funnel. The water inlet 14 discharges to the water supply inlet 21 of the steam production chamber 20. The steam generator 5 has a lower wall 13 in which is formed the said at least one steam distribution outlet 15. The steam generator 5 has an external side wall 12 extending below the water reservoir 6 arranged on the steam generator 5.

In the embodiment illustrated in FIG. 4, the heating device 50 is arranged in the bottom of the steam production chamber 20. The heating device 50 may in particular comprise a screen-printed heating element, or a reinforced heating element arranged under a heat diffusion plate and/or in a heat diffusion plate. As a variant, the heating device 50 could in particular be arranged inside the steam production chamber 20.

According to a preferred embodiment, the steam production chamber 20 has at least one steam evacuation outlet 22, positioned higher than the water supply inlet 21, the said at least one steam evacuation outlet 22 communicating with the said at least one steam distribution outlet 15.

In the embodiment illustrated in FIG. 4, the steam production chamber 20 has several steam evacuation outlets 22 positioned higher than the water supply inlet 21 and communicating with the steam distribution outlets 15. The steam production chamber 20 is arranged in the steam generator 5 away from the lower wall 13, which allows more freedom in the position of the steam distribution outlets 15. The steam production chamber 20 is arranged in the steam generator 5 away from the external side wall 12. The lower part 10 forms the lower wall 13.

The water reservoir 6 comprises a drain outlet 32 supplying the steam generator 5 with water.

In the embodiment illustrated in FIG. 4, the steamer accessory 4 comprises at least one airway 38 bringing the drain outlet 32 into communication with the outside when the water reservoir 6 is arranged on the steam generator 5. As is clearly visible in FIG. 4, the said at least one airway 38 is provided between the water reservoir 6 and the steam generator 5, more specifically between a lower face 33 of the water reservoir 6 and the upper face 19 of the steam generator 5. The water reservoir 6 and/or the steam generator 5 may for this purpose have spacers (not pictured in FIG. 4) to separate the lower face 33 of the water reservoir 6 from the upper face 19 of the steam generator 5. As a variant, the said at least one airway 38 may in particular be provided in the water reservoir 6 and/or in the steam generator 5.

In the embodiment illustrated in FIG. 4, the drain outlet 32 is arranged in a lower face 33 of the water reservoir 6. The lower part of the water reservoir 6 rests on the upper part of the steam generator 5.

More specifically, the drain outlet 32 extends above the water supply inlet 21 of the steam production chamber 20. The drain outlet 32 presents a valve 34 that can move between a closed position in which the drain outlet 32 is closed and a drainage position in which the drain outlet 32 allows the water to flow out of the water reservoir 6.

Preferably, the water reservoir 6 comprises at least one bearing surface 36 extending below the valve 34 positioned in the closed position, to prevent inadvertent actions of the valve 34. According to a preferred embodiment, the valve 34 is surrounded by a conduit 30 extending below the valve 34 positioned in the closed position.

In the embodiment illustrated in FIG. 4, the steam generator 5 has a lug 17 pushing the valve 34 toward the drainage position when the water reservoir 6 is arranged on the steam generator 5. As visible in FIG. 4, the lug 17 is arranged in the steam production chamber 20. The valve 34 is able to move in a principally vertical direction. The valve 34 is pushed toward the closed position by an elastic return element 35. The elastic return element 35 is advantageously formed by a helical spring. The bearing surface 36 is formed by the drain outlet 32. As a variant, the valve 34 may have a lug pushed by the steam production chamber 20 when the water reservoir 6 is arranged on the steam generator 5.

According to a preferred embodiment, the water reservoir 6 may be positioned on the steam generator 5 according to several angular orientations. In the embodiment illustrated in FIG. 4, the water reservoir 6 may be positioned on the steam generator 5 without special indexing. More specifically, the water inlet 14 is arranged in the central part of the upper face 19 of the steam generator 5.

According to a preferred embodiment, the water reservoir 6 comprises a gripping device 40. In the embodiment illustrated in FIG. 4, the gripping device 40 is arranged opposite the drain outlet 32. The gripping device 40 has a bearing surface 41 designed to hold the water reservoir 6 when the water reservoir 6 is positioned upside-down.

The water reservoir 6 may be made in two assembled parts, which can be dismountable if desired, in particular for filling and/or for cleaning. In the embodiment illustrated in FIG. 4, the lower face 33 of the water reservoir 6 is formed by a base 42 comprising an orifice 43 around which is mounted a stopper 44 presenting the drain outlet 32. The stopper 44 houses the valve 34. A body 45 is mounted on the base 42. The gripping device 40 comes out of the body 45. The body 45 may be assembled such that it may or may not be dismountable from the base 42. As a variant, the gripping device 40 may in particular come out of the base 42, or be connected or fixed on the body 45 or on the base 42. The water reservoir 6 may comprise a filling orifice separate from the drain outlet 32. If desired, the filling orifice may be closed.

The steamer accessory 4 illustrated in FIG. 1 and the electric steamer accessory 1 illustrated in FIG. 3, comprising the steam generator 5 illustrated in FIG. 4, operate and are used as follows.

The user first fills the water reservoir 6, for example by removing the base 42 from the body 45 after having turned over the water reservoir 6. The user then places the base 42 back on the body 45 and again turns over the water reservoir 6 to position the water reservoir 6 on the steam generator 5. The drain outlet 32 of the water reservoir 6 then extends into the water inlet 14 of the steam generator 5. The valve 34 is pushed toward the drainage position by the steam generator 5 when the water reservoir 6 is arranged on the steam generator 5. The lug 17 then extends inside the conduit 30 and pushes the valve 34 toward the drainage position, such that the water coming from the drain outlet 32 of the water reservoir 6 flows into the water inlet 14 of the steam generator 5 to reach the drain outlet 32 of the water reservoir 6. The water level rises in the steam production chamber 20 until it reaches the drain outlet 32. The water reservoir 6 positioned on the steam generator 5 forms a closed chamber 39 above the drain outlet 32. The water cannot flow out of the water reservoir 6 unless air takes its place. In this regard, the drain outlet 32 communicating with the outside of the steamer accessory 4 through the airway 38 allows air to enter the water reservoir 6, as long as the water level does not reach the drain outlet 32.

The user then turns on the heating device 50. The temperature of the water in the steam production chamber rises until steam is produced. The steam then escapes via the steam evacuation outlets 22 to reach the steam distribution outlets 15 and expand in the container 2 to cook or heat the food in the container 2. The air above the food can escape through the vent 90. The production of steam leads the water level in the steam production chamber 20 to drop below the drain outlet 32, which allows the steam production chamber 20 to be resupplied with water. The water can then drain from the water reservoir 6 via the drain outlet 32, until the water level reaches the drain outlet 32, with air from the outside of the steamer accessory 4 passing through the airway 38 to enter the water reservoir 6 through the drain outlet 32.

When the food in the container 2 is saturated with steam, the steam escapes through the vent 90 provided in the ring 80.

The water reservoir 6 supplies water to the steam production chamber 20 by gravity. In other words, the water flows from the water reservoir 6 to supply the steam production chamber 20.

As a variant, the water reservoir 6 does not necessarily have a valve 34. The drain outlet 32 of the water reservoir 6 may in particular be calibrated so that the water flow entering the steam production chamber 20 allows the water in the steam production chamber 20 to vaporize without water overflowing from the steam production chamber 20.

As a variant, the water inlet 14 and the water supply inlet 21 may be combined.

As a variant, the water reservoir 6 may be locked by bayonet closure on the steam generator 5. In this regard, the water reservoir 6 may, for example, comprise tabs provided for fastening by rotation to the steam generator, or vice versa.

As a variant, the steamer accessory 4 may comprise a pump to control the flow of water out of the water reservoir 6 in order to supply the steam production chamber 20. To simplify the electrical connections, the pump may advantageously be arranged in the steam generator 5.

FIG. 4 corresponds to the execution of the heating part of the steamer accessories illustrated in FIGS. 1, 2 and 3. In the embodiment illustrated in FIG. 4, the steamer accessory 4 comprises the steam generator 5 and the water reservoir 6. The steam generator 5 carries the water reservoir 6. As represented in FIGS. 1 and 2, the ring 80; 80' carries the steam generator 5. Thus, the water reservoir 6 is carried by the ring 80; 80', as is clearly visible in FIGS. 1 and 2.

FIGS. 5 to 7 illustrate another embodiment of a steam generator 105 belonging to a steamer accessory 104 also comprising at least one ring (not represented in the figures), intended to carry the steam generator 105.

The steamer accessory 104 is intended for steam-heating and or steam-cooking food contained in a container (also not represented in the figures). The steamer accessory 104 comprises the steam generator 105 and a water reservoir 106.

The water reservoir 106 communicates with the outside via a filling orifice 160. If desired, the water reservoir 106 may have at least one other filling orifice.

The steam generator 105 comprises a steam production chamber 120. The water reservoir 106 supplies water to the steam production chamber 120 by gravity. In this regard, the water reservoir 106 communicates via a water supply inlet 121 with the steam production chamber 120. If desired, the water reservoir 106 may communicate with the steam production chamber 120 through at least one other water supply inlet.

Preferably, the water reservoir 106 has a bottom 108 discharging towards the water supply inlet 121.

In the embodiment illustrated in FIGS. 5 to 7, the water reservoir 106 surrounds the steam production chamber 120. In this regard, an annular wall 124, better visible on FIG. 7, surrounds the steam production chamber 120. The water supply inlet 121 is formed in the annular wall 124.

The steam production chamber 120 comprises a heating device 150 to transform the water in the steam production chamber 120 into steam. In the embodiment illustrated in FIGS. 5 to 7, the heating device 150 comprises a heating pad 151. As a variant, the heating device 150 may in particular comprise a heating element arranged under a heat diffusion plate and/or in a heat diffusion plate forming at least a part of the bottom of the steam production chamber 120. If desired, the steam production chamber 120 may comprise several heating devices.

The steam production chamber 120 is connected to at least one steam distribution outlet 115 provided in a lower part 110 of the steam generator 105. In this regard, the steam production chamber 120 communicates with at least one steam evacuation outlet 122 arranged higher than the water supply inlet 121. The steam production chamber 120 is confined above the steam evacuation outlet(s) 122. The or each steam evacuation outlet 122 communicates via a conduit 125 with the or one of the steam distribution outlet(s) 115.

More specifically, in the embodiment illustrated in FIGS. 5 to 7, the steam production chamber 120 communicates with the steam evacuation outlet(s) 122 via a steam expansion chamber 170 arranged above the steam production chamber 120. In other words, the said steam expansion chamber has no communication with the outside above the said at least one steam evacuation outlet 122. A separating side wall 180 is arranged between the filling orifice 160 and the steam expansion chamber 170 in order to prevent steam from escaping from the filling orifice 160. In this regard, the separating side wall 180 extends lower than the steam evacuation outlet(s) 122. In other words, the separating side wall 180 extends below the steam evacuation outlet(s) 122. More specifically, the separating side wall 180 extends lower than the water supply inlet 121. As is clearly visible in FIGS. 5 to 7, the separating side wall 180 extends into the water reservoir 106. In other words, the water may reach the two faces of the lower part of the separating side wall 180.

In the embodiment illustrated in FIGS. 5 to 7, the steam production chamber 120 has several steam evacuation outlets 122 arranged higher than the water supply inlet 121 and communicating via several conduits 125 with the steam distribution outlets 115. More specifically, the conduits 125 are provided in the annular wall 124. Two groups of three conduits 125 are arranged on both sides of the heating pad 151. The conduits 125 are vertical. As a variant, the conduits 125 may be descending without necessarily being vertical. Preferably, the conduits 125 do not have baffles. In other words, the conduits 125 are descending in a continuous manner, without necessarily being straight.

More specifically, the steam generator 105 has an annular lower bearing surface 109 intended to rest on the ring. Thus, when the annular lower bearing surface 109 is resting on the ring, the ring carries the steam generator 105. Thus, when the annular lower bearing surface 109 is resting on the ring, the water reservoir 106 is carried by the ring.

The steam generator 105 has a lower wall 113 in which is/are formed the steam distribution outlet(s) 115. The steam production chamber 120 is arranged in the steam generator 105 away from the lower wall 113, which allows more freedom in the position of the steam distribution outlets 115.

The steam generator 105 has an external side wall 112. The bottom 108 of the water reservoir 106 connects the external side wall 112 to the annular wall 124. The steam production chamber 120 is arranged in the steam generator 105 away from the external side wall 112.

The steamer accessory 104 has a top wall 116 advantageously made of transparent or translucent material. The top wall 116 is assembled with the external side wall 112, for example by clipping, bonding, overmoulding, screwing or welding. The top wall 116 forms a part of the water reservoir 106. The separating side wall 180 comes out of the top wall 116. The top wall 116 forms the upper part of the steam expansion chamber 170.

The steamer accessory 104 illustrated in FIGS. 5 to 7 functions and is used in the following manner.

The user places the steamer accessory 104 on a container after having placed the food in a container. The user fills the water reservoir 106 through the filling orifice 160. The water flows through the water supply inlet 121 into the steam production chamber 120. Preferably, the user fills the water reservoir 106 to a level sufficiently lower than the steam evacuation outlets 122 to prevent the water from reaching the steam evacuation outlets 122 and flowing through the conduits 125. The user then turns on the heating device 150. The temperature of the water in the steam production chamber 120 rises until steam is produced. The steam rises from the steam production chamber 120 to reach the steam expansion chamber 170. The steam is then confined by the top wall 116, by the separating side wall 180 and by the water in the water reservoir 106. The steam then escapes via the steam evacuation outlets 122 to reach the steam distribution outlets 115 by descending through the conduits 125. The steam exiting the steam distribution outlets 115 spreads through the container. The air above the food can escape through the vent.

When the food in the container is saturated with steam, the steam escapes through the vent provided in the ring.

As a variant, the ring 80; 80' may provide, if desired, with the steam generator 5; 105, at least one vent 90; 90' bringing the lower face 81; 81' of the ring 80; 80' into communication with the upper face 82; 82' of the ring 80; 80'.

As a variant, the steam generator 5; 105 may have at least one vent bringing the lower part 10; 110 of the steam generator 5; 105 into communication with an external part 11; 111 of the steam generator 5; 105.

This invention is in no way limited to the embodiment examples described and their variants, but encompasses many modifications in the context of the claims.

The invention claimed is:

1. A steamer accessory for steam-heating and/or steam-cooking food contained in a container, the steamer accessory comprising:
 a steam generator comprising a steam production chamber connected to at least one steam distribution outlet provided in a lower part of the steam generator,
 a first annular wall surrounding the steam production chamber,
 a steam expansion chamber arranged above the steam production chamber and the first annular wall,
 a water supply inlet formed in the first annular wall, and
 a ring carrying the steam generator and a water reservoir, the ring having a lower face and an upper face,
 wherein the ring provides at least one vent bringing the lower face of the ring into communication with the upper face of the ring,
 wherein the water reservoir is configured to supply the steam production chamber with water by gravity,
 wherein the first annular wall comprises at least one conduit, each of the at least one conduit extending between a steam evacuation outlet in fluid communication with the steam expansion chamber and one of the at least one steam distribution outlet,
 wherein the ring is removable from the steam generator, and
 wherein the ring comprises a second annular wall surrounding the steam generator.

2. The steamer accessory according to claim 1, wherein the second annular wall is made of glass.

3. The steamer accessory according to claim 1, wherein the at least one vent passes through the second annular wall.

4. The steamer accessory according to claim 1, wherein the at least one vent is provided between the ring and the steam generator.

5. The steamer accessory according to claim 1, wherein the ring comprises an annular seal carrying the steam generator.

6. The steamer accessory according to claim 5, wherein the at least one vent is provided in the annular seal.

7. The steamer accessory according to claim 1, wherein the steam generator has an annular lower bearing surface.

8. The steamer accessory according to claim 1, wherein the steam generator has an external side wall and wherein the steam production chamber is arranged in the steam generator away from the external side wall.

9. An electric steamer comprising a container to contain the food to be heated and/or cooked, and a cover configured to rest on the container, in which the cover forms a steamer accessory for steam-heating and/or steam-cooking the food contained in the container wherein the steamer accessory is according to claim 1.

10. The steamer accessory according to claim 1, wherein the water reservoir surrounds the steam production chamber.

11. The steamer accessory according to claim 1, wherein the ring comprises an edge configured to rest on the container.

* * * * *